INVENTOR
Horace BOIVIN

United States Patent Office 3,002,868
Patented Oct. 3, 1961

3,002,868
SPONGE BACK FLOOR COVERING
Horace Boivin, Granby, Quebec, Canada
Filed Mar. 2, 1959, Ser. No. 796,338
2 Claims. (Cl. 154—49)

This invention relates to a cushioned floor covering consisting essentially of a sheet of fabric having adhered thereon a resilient backing and a wear-resistant facing.

Preferably the facing is made of polyvinyl chloride, which is a hard-wearing and washable material.

The sheet of fabric is preferably of woven glass fibres, and it presents three main advantages. Firstly, it acts as a reinforcement, both to prevent tearing of the floor covering during handling and to avoid spreading and consequent humping of the floor covering once it is installed. In the second place, it provides improved adherence of the floor covering elements since its adherence properties to the facing and to the backing are far superior to the adherence properties between the facing and the backing themselves, if the glass fibre sheet were not used. Further, the sheet of glass fibres gives the floor covering fire-resistant qualities, since of course the glass fibre is a fire-proof material.

The resilient backing may be made of any type of cushioning sheet material, such as foam rubber, vinyl foam or the like.

According to a preferred embodiment of the invention, the polyvinyl chloride facing is also made of a fire-proof or fire-resistant resin.

The floor covering in accordance with the invention has greatly improved qualities. It is highly sound insulating, and, when used in congested areas, it eliminates vibration from traffic. It is very hard wearing and extremely easy to clean and wash. Its agreeable and restful softness compares with that of a deep pile carpet.

Due to its various qualities, the floor covering according to the invention is capable of almost universal application. Since it is hard wearing, it may be used to advantage in playrooms, corridors, stairs, public buildings, schools, churches, stores, restaurants, gymnasiums, etc. Its ease of cleaning makes it particularly useful in kitchens and bathrooms. In hospitals, libraries and theatre lobbys its noise-absorption qualities may be put to best advantage; and the fact that it is fire-resistant, makes it particularly suitable for airplanes and boats.

An embodiment of the invention is illustrated in the accompanying drawings, wherein.

Figure 1:
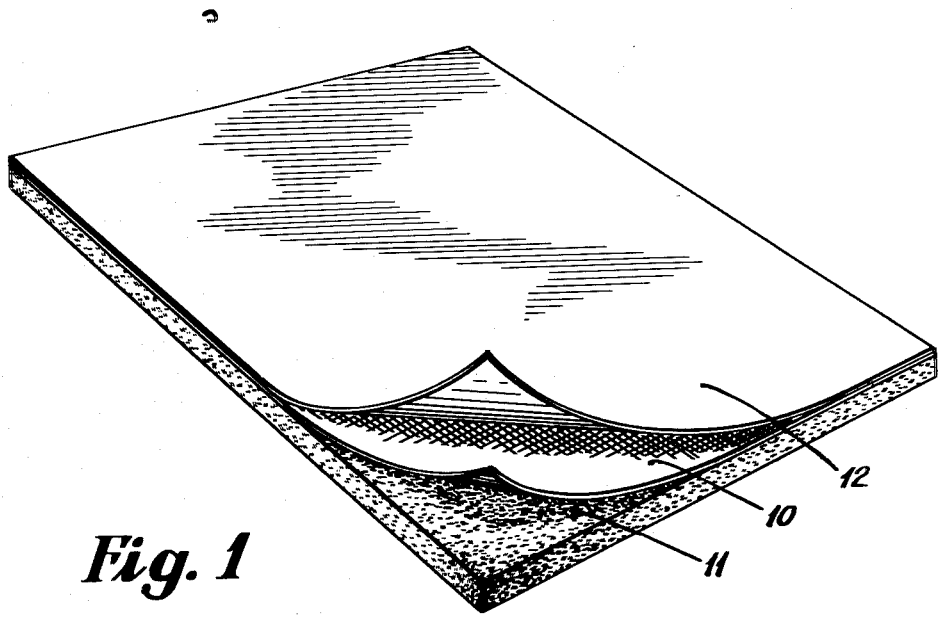
FIGURE 1 is a perspective view of a sample of the floor covering with the three constituents thereof separated at one corner.
Figure 2:
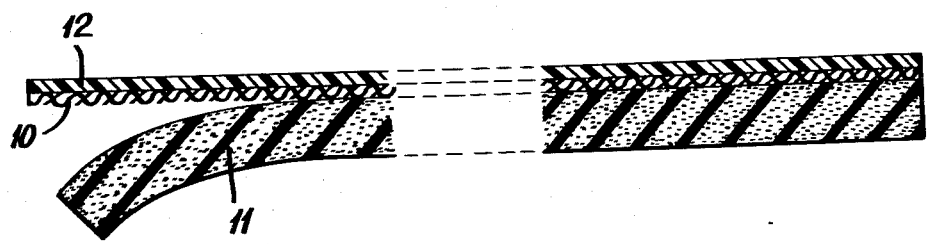
FIGURE 2 is a section on an enlarged scale, showing the sponge backing partly separated.
Figure 3:
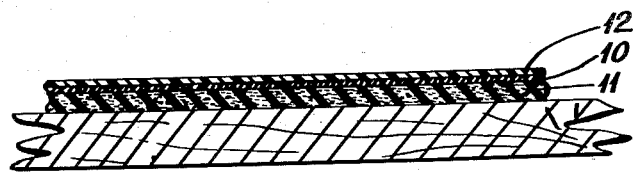
FIGURE 3 is a section shown in place on a floor.

The drawings show the three parts of the floor covering as mentioned above, namely the fabric sheet 10, the backing 11, and the facing 12.

The sheet is preferably made of a tightly woven fabric of glass threads.

The facing, which is of polyvinyl chloride, is preferably provided with an inlaid or printed design, and its surface may be slightly textured by well-known techniques. In order to make the facing fire-proof or fire-resistant, tri-cresyl phosphate is used as a plasticizer and antimony oxide is mixed in with the plastisol.

The backing is preferably of foam rubber or vinyl foam. Such a backing has the further advantage of providing a frictionally gripping surface which prevents slipping of the floor covering. The floor covering is manufactured by first depositing the polyvinyl chloride on the glass fibre sheet to a thickness of approx. $\frac{1}{16}$ of an inch. A sheet of sponge about $\frac{3}{16}$ in. thick is thereafter bonded to the other side of the glass fibre fabric. The particular features of the invention described above are given merely by way of example, and many variations are possible within the scope of the appended claims.

I claim:
1. A floor covering comprising: a sheet of reinforcing tightly woven glass fabric united, on one face thereof, to a resilient sponge backing layer and adhering, on the other face thereof, to a facing layer of a wear-resistant resin.

2. A floor covering comprising: a sheet of reinforcing tightly woven glass thread fabric united, on one face thereof, to a backing layer of sponge rubber and adhering, on the other face thereof to a facing layer of polyvinyl chloride.

References Cited in the file of this patent
UNITED STATES PATENTS

| | | |
|---|---|---|
| 2,239,457 | Gibbons | Apr. 22, 1941 |
| 2,389,210 | Pitman | Nov. 20, 1945 |
| 2,629,678 | Thompson et al. | Feb. 24, 1953 |
| 2,703,775 | Panagrossi et al. | Mar. 8, 1955 |
| 2,816,852 | Banks | Dec. 17, 1957 |
| 2,875,435 | McMillan | Feb. 24, 1959 |